(No Model.)
J. F. MORELL & C. TILTON.
CAR BRAKE AND STARTER.
No. 350,890. Patented Oct. 12, 1886.
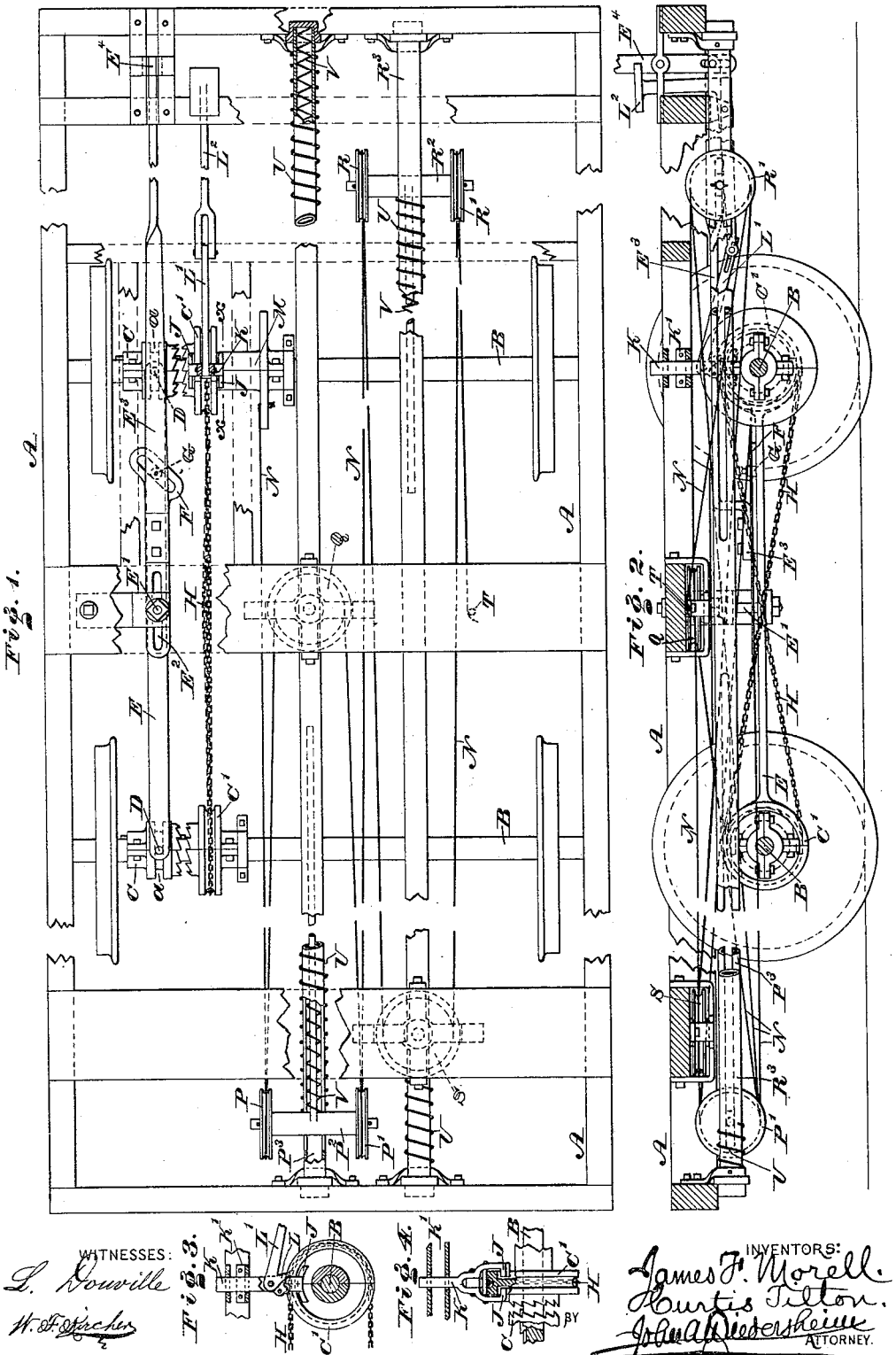
WITNESSES:
INVENTORS:
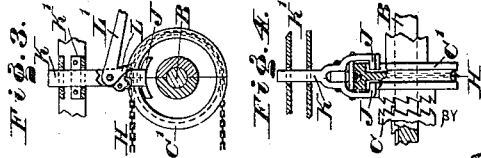

UNITED STATES PATENT OFFICE.

JAMES F. MORELL, OF CAMDEN, NEW JERSEY, AND CURTIS TILTON, OF PHILADELPHIA, PENNSYLVANIA, ASSIGNORS TO THE AUTOMATIC CAR BRAKE STARTER AND PROPELLER COMPANY, OF CAMDEN, N. J.

CAR BRAKE AND STARTER.

SPECIFICATION forming part of Letters Patent No. 350,890, dated October 12, 1886.

Application filed March 15, 1886. Serial No. 195,229. (No model.)

*To all whom it may concern:*

Be it known that we, JAMES F. MORELL, of the city and county of Camden, and State of New Jersey, and CURTIS TILTON, of the city and county of Philadelphia, State of Pennsylvania, both citizens of the United States, have invented a new and useful Improvement in Car Brakes and Starters, which improvement is fully set forth in the following specification and accompanying drawings, in which—

Figure 1 represents a top or plan view of a car brake and starter embodying our invention. Fig. 2 represents a partial side elevation and partial vertical section thereof. Fig. 3 represents a vertical section of a detached portion in line $x\,x$, Fig. 1. Fig. 4 represents a front view of a detached portion partly broken away and partly in section.

Similar letters of reference indicate corresponding parts in the several figures.

Our invention consists of improvements in car brakes and starters, whereby the same may be effectively and powerfully operated, as will be hereinafter fully set forth.

Referring to the drawings, A represents a car-truck, which, excepting as far as the features of our invention applied thereto are concerned, is of usual construction.

B represents the axles, each of which carries a clutch, C C'. The parts C of said clutches, which are connected with the axles by means of feather-joints, so as to slide thereon and rotate therewith, have necks $a$, into which are freely fitted pins D, which are connected with a lever, E, the latter being pivoted to the truck by means of a bolt, E', said bolt also passing through a longitudinally-extending slot, $E^2$, which is formed in a sliding lever, $E^3$, the latter being connected at its outer end with an operating-lever, $E^4$. A link-shaped piece, F, formed of metal or other suitable material, is secured to the lever $E^3$, and extends in a diagonal direction, and into the same projects a stud or roller, G, which is secured to the lever E in a vertical direction. The lever $E^4$ operates the lever $E^3$, and is accessible at the platform of the car, and when said lever $E^4$ is moved the lever E is deflected to the right or left, as the case may be, by the piece F and stud G, and thus the clutch of one axle is engaged and that of the other axle is disengaged. Passing around the loose parts or pulleys C' of the clutches is an endless crossed chain, H, and at the side of one of said pulleys, are brake-shoes J, whose support K is fitted loosely between bars or guides K', so as to be capable of rising and falling, said bars being secured to the truck. A pawl, L, is hung from said support, and engages with the chain H, and is attached to an arm, L', whose outer end is pivoted to an elbow-lever, $L^2$, the latter being mounted on the truck and accessible from the platform of the car.

Connected with one of the loose parts of the clutches is a drum, M, to which is secured a cord, N, the latter passing from said drum around a pulley, P, next around a pulley, Q, and returning around a pulley, P', which it will be seen is on the same shaft $P^2$ with the pulley P. The cord then passes around a pulley, R, a pulley, S, and a pulley, R', and is finally secured to the truck, as at T, the pulleys R R' being on the same shaft $R^2$, it being noticed that the pulleys P P' and pulleys R R' are at opposite ends of the truck. The pulley Q is at or near the middle of the truck, and the pulley S is opposite to the pulleys R R', the cord thus extending zigzag and having a long range.

The shafts $P^2$ $R^2$ are mounted on guides $P^3$ $R^3$, respectively, and adapted to slide thereon toward each other in horizontal directions, said guides being secured to the truck, and also supporting springs U, which bear outwardly against the shafts $P^2$ $R^2$, so that when the shafts are moved inwardly or toward each other the springs are compressed.

Within the guides $P^3$ $R^3$ are springs V, which also bear against the shafts $P^2$ $R^2$, similar to the springs U, so that the effect of two springs is obtained, but to this we do not limit ourselves.

It will be seen that when the clutches are in the position shown in Fig. 1 the clutch-pulleys C' are inoperative. When, however, it is desired to stop the car, the lever $E^3$ is moved, whereby the proper clutches of one of the axles are engaged, and thus the drum M is rotated. This winds the cord N on said drum and draws the shafts P² R² toward each other, thus compressing the springs U U and likewise the springs V V, when employed, and storing the power thereof, the resistance of the springs retarding the rotation of the axles and thus providing a brake for the car. The pawl L engages with the crossed chain H and is advanced by the same, whereby the support K is elevated, and the brake-shoes J tighten against the rim of the contiguous clutch-pulley, thus holding the latter and preventing rotation of the drum M. When the car has stopped or is about to stop, the lever E³ is let go, whereby the lever E and the connected parts C of the clutches are returned to their normal positions. When the car is to be started, the lever E³ is again operated, so that the clutches of the other axle are engaged and the arm L' is operated, whereby the pawl L is raised and the brake-shoes are removed from contact with the rim of the clutch-pulley and hang freely at the sides of the latter. The drum M is thus released, and the springs become operative, thus returning the pulleys P P' R R' to their normal positions and unwinding the cord from said drum, the resultant power being transmitted to the clutch-pulley, which is connected with the drum, and thence by means of the crossed chain H to the clutch-pulley on the other axle, which pulley being clutched with its axle causes the rotation of the latter and thus starts the car. When the cord upon said drum is unwound, or when its further unwinding is prevented by dropping the pawl L, the clutch-pulley on the rear axle automatically unclutches itself and sets both clutches, as in Fig. 1, in their normal positions, ready for repetition of the operations named.

Having thus described our invention, what we claim as new, and desire to secure by Letters Patent, is—

1. A car brake and starter having clutches, an endless belt or chain, a drum, and a cord which is adapted to be wound on said drum and passed around a pulley whose shaft has bearing against it, a spring which is compressed when the cord is wound on the drum, and its power thus stored for subsequently starting the car, substantially in the manner described.

2. A car brake and starter having clutch mechanism for the axles, a pivoted lever for operating said mechanism, and a sliding lever for operating the pivoted lever, said levers being connected, whereby the pivoted lever receives lateral motions, substantially as and for the purpose set forth.

3. In a car brake and a starter, clutch operating mechanism, consisting of pivoted and sliding levers which are connected by means of a stud or roller, and a diagonally-extending guide, whereby lateral motions are imparted to the pivoted lever, substantially as described.

4. In a car brake and starter, clutch mechanism, a drum adapted to be connected with said mechanism, a cord adapted to be wound on said drum and passing around a pulley having its axis adapted to slide on the truck, and a spring bearing against said axis, substantially as and for the purpose set forth.

5. In a car brake and starter, clutch mechanism, a crossed chain or belt passed around the pulleys of said clutches, and a pawl which engages with said belt and controls the same, substantially as described.

6. In a car brake and starter, a brake-shoe connected with a movable support, and a pawl mounted on said support, in combination with a clutch-pulley, a drum connected with said pulley, a cord or chain adapted to be wound on said drum, and a spring which exerts its power on said cord, substantially as described.

7. In a car brake and starter, a cord or chain, and a drum on which the same may be wound, in combination with a pulley around which said cord passes, a movable axle supporting said pulley, and a spring bearing against said axle, substantially as described.

8. In a car brake and starter, a spring, a cord or chain and winding mechanism, a clutch mechanism, a crossed chain or belt passed around the pulleys of said clutches, and a pawl and brake-shoe, said pawl and shoe being connected with a support, substantially as described, whereby the pawl engages with said chain and causes the shoe to bear against one of the pulleys, and the winding mechanism is controlled, as stated.

9. Clutch mechanism and operating-levers thereof, in combination with a drum, pulleys having sliding axes, springs bearing against said axes, and a cord which is adapted at one end to be wound on said drum, is passed zigzag around said pulleys, and is secured at the other end to the car-truck, substantially as described.

J. F. MORELL.
CURTIS TILTON.

Witnesses:
JOHN A. WIEDERSHEIM,
A. P. GRANT.